US011301190B2

(12) United States Patent
Kakitsuba

(10) Patent No.: US 11,301,190 B2
(45) Date of Patent: Apr. 12, 2022

(54) NON-TRANSITORY COMPUTER-READABLE RECORDING MEDIUM, INFORMATION PROCESSING APPARATUS AND PRINTING METHOD

(71) Applicant: BROTHER KOGYO KABUSHIKI KAISHA, Nagoya (JP)

(72) Inventor: Ryota Kakitsuba, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/749,059

(22) Filed: Jan. 22, 2020

(65) Prior Publication Data

US 2020/0249890 A1 Aug. 6, 2020

(30) Foreign Application Priority Data

Feb. 1, 2019 (JP) .............................. JP2019-017089

(51) Int. Cl.
*G06F 3/12* (2006.01)

(52) U.S. Cl.
CPC .......... *G06F 3/1259* (2013.01); *G06F 3/1231* (2013.01); *G06F 3/1291* (2013.01)

(58) Field of Classification Search
CPC .... G06F 3/1259; G06F 3/1291; G06F 3/1231; G06F 3/1285; G06F 3/1207
See application file for complete search history.

(56) References Cited

U.S. PATENT DOCUMENTS

| 2008/0123130 | A1* | 5/2008 | Matsumoto ........... G06F 3/1285 358/1.15 |
| 2013/0286427 | A1* | 10/2013 | Tomomatsu .......... G06F 3/1259 358/1.14 |
| 2017/0006468 | A1 | 1/2017 | Takahashi et al. |
| 2017/0160997 | A1* | 6/2017 | Morita .................. G06F 3/1205 |
| 2017/0223210 | A1 | 8/2017 | Yamada |
| 2018/0143793 | A1 | 5/2018 | Kobayashi |

FOREIGN PATENT DOCUMENTS

| JP | H08-305520 A | 11/1996 |
| JP | 2017-016480 A | 1/2017 |
| JP | 2017-134718 A | 8/2017 |
| JP | 2018-084978 A | 5/2018 |

OTHER PUBLICATIONS

International Search Report and Written Opinion dated Mar. 24, 2020 of the International Searching Authority issued in the PCT application No. PCT/JP2020/002923 together with English translations.

* cited by examiner

*Primary Examiner* — Huo Long Chen
(74) *Attorney, Agent, or Firm* — Scully, Scott, Murphy & Presser, PC

(57) ABSTRACT

After an editing application outputs a print instruction to a general-use printing program to cause a printer to execute printing of an image and the general-use printing program generates print data based on the print instruction, a supporting program causes a PC to identify a printer to be caused to execute a print job corresponding to the print instruction, to obtain status information by inquiring of the identified printer a status of the print job, and to provide the status information obtained from the printer for a the editing application.

13 Claims, 8 Drawing Sheets

| PRINTER | JOB | STATUS | ERROR |
|---|---|---|---|
| PRINTER A | JOB A | PRINTING COMPLETED | |
| | JOB B | EXECUTING PRINTING | |
| | JOB C | UNEXECUTED | |
| PRINTER B | JOB D | ABORTING PRINTING | NO SHEET |
| | JOB E | UNEXECUTED | |

FIG. 4

NON-TRANSITORY COMPUTER-READABLE RECORDING MEDIUM, INFORMATION PROCESSING APPARATUS AND PRINTING METHOD

CROSS-REFERENCE TO RELATED APPLICATIONS

This application claims priority under 35 U.S.C. § 119 from Japanese Patent Application No. 2019-017089 filed on Feb. 1, 2019. The entire subject matter of the application is incorporated herein by reference.

BACKGROUND

Technical Field

The technical field disclosed in the present specification relates to a non-transitory computer-readable recording medium containing instructions realizing a supporting program which supports control of a printer, an information processing apparatus and a printing method.

Related Art

There has been widely known a technique to control a printer from an information processing apparatus such as a personal computer, a configuration of installing a printer driver in the information processing apparatus, generating print data using the printer driver and transmitting the print data to the printer. The printer driver is provided by a manufacturer of the printer and is adapted to various functions the printer has, and thus can make full use of the printer.

SUMMARY

Recently, a technique of controlling a printer using a general-use printing program which is standardly implemented in an operating system (OS), without using the above-mentioned printer driver, has been in practical use. According to such a technique, when the OS detects a printer, the OS associates the printer with the OS-standard printing program. Thereafter, it becomes possible that, when the OS receives a print instruction corresponding to the printer, printing is executed using the OS-standard general-use printing program, without using the printer driver.

Even in the above-mentioned printing using the OS-standard general-use printing program, as with the printing using the printer driver, a process corresponding to a print instruction output by the application program is terminated when print data is accumulated in a print queue of the OS. Therefore, a user cannot know, through the application program, the status of the process after the print data is registered in the print queue.

The present specification discloses a technique in which, in an information processing apparatus in which an OS-standard general-use printing program is implemented, a status of a process based on a print instruction can be recognized in detail through an application program to which the print instruction is input.

According to aspects of the present disclosure, there is provided a non-transitory computer-readable recording medium for an information processing apparatus, the information processing apparatus having a controller, the recording medium containing computer-executable instructions realizing a supporting program corresponding to a printer connected to the information processing apparatus. The supporting program, as executed by the controller, causing the information processing apparatus to perform an identifying process, a status obtaining process and a status providing process. The identifying process, the status obtaining process and the status providing process are performed after a print instruction is output to a general-use printing program implemented in an operating system of the information processing apparatus and the general-use printing program generates print data based on the print instruction, the print instruction being an instruction to cause a printer connected to the information processing apparatus to perform printing of an image. The print instruction is an instruction output from an application program implemented in the information processing apparatus. The identifying process is a process of identifying the printer to be caused to execute a print job corresponding to the print instruction. The status obtaining process is a process of obtaining status information of the print job by inquiring of an identified printer, through a communication interface of the information processing apparatus. The identified printer being a printer identified by the identifying process. The status providing process is a process of providing the application program with the status information of the print job obtained by the status obtaining process.

BRIEF DESCRIPTION OF THE ACCOMPANYING DRAWINGS

FIG. 4 is a drawing showing an example of a status information list.

DETAILED DESCRIPTION OF THE EMBODIMENT

Hereinafter, referring to the accompanying drawings, a print system using programs according to the embodiment will be described in detail. The present embodiment shows a concrete example of the print system including a personal computer (hereinafter, referred to as a "PC") and a printer.

Figure 1:
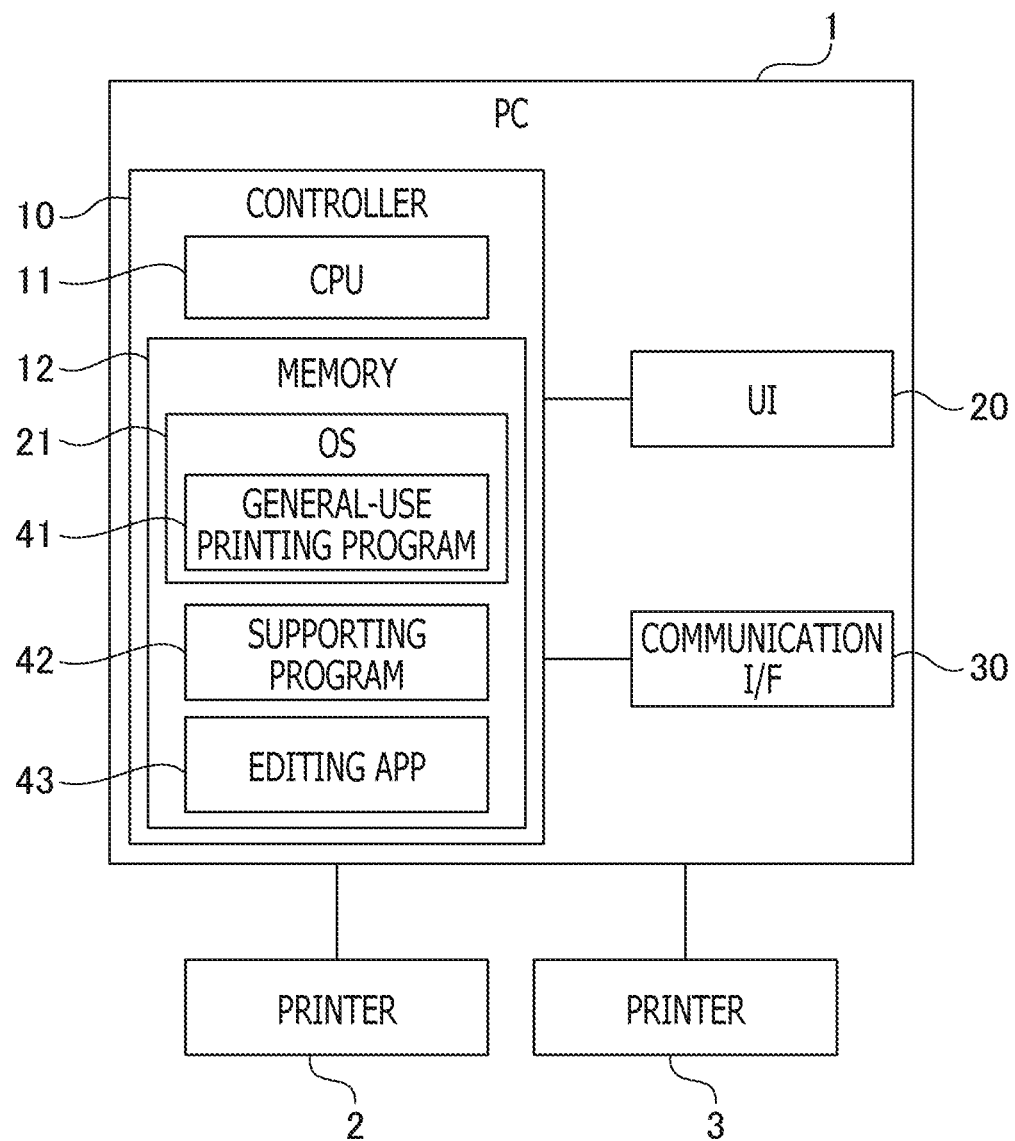
FIG. 1 is a block diagram showing an electrical configuration of a print system.

An example of a configuration of a print system in which programs according to the embodiment are executed is shown in FIG. 1. The system shown in FIG. 1 includes a PC 1, a printer 2 and a printer 3. The PC 1 is an example of an information processing apparatus. The printer 2 and the printer 3 are devices having a printing function and are configured to communicate with the PC 1 through a local communication or a network communication.

As shown in FIG. 1, the PC 1 includes a controller 10, a user interface (hereinafter, referred to as a "UI") 20 and a communication interface (hereinafter, referred to as a "communication I/F") 30. The UI 20 and the communication I/F 30 are electrically connected to the controller 10.

The UI 20 includes hardware configured to display various pieces of information and receive user's input of instructions. The UI 20 may include a touch panel having both an input receiving function and a displaying function, or a combination of a display having a displaying function and a keyboard and/or a mouse having an input receiving function. The UI 20 is an example of a display device.

The communication I/F 30 includes hardware configured to communicate with the printer 2 and a hardware configured to access the Internet. The communication I/F 30 may include multiple interfaces respectively employing different communication methods. Examples of the communication methods may include the network communication, a USB communication and the like. Further, the communication methods may be wired or wireless.

The controller 10 includes a CPU 11 and a memory 12. The CPU 11 is an example of a computer. The memory 12 includes a ROM, a RAM and a non-volatile memory and stores various application programs (hereinafter, referred to as "APP's") and various pieces of data. According to the present specification, details of the memories could be ignored and any memory having a suitable function could be employed as the memory 12. The CPU 11 executes various processes in accordance with programs retrieved from the memory 12 or in accordance with user's instructions. It is noted that the controller 10 in FIG. 1 is a collective name including hardware and software used to control the PC 1 and does not necessarily represent a single piece of hardware.

An example of the memory 12 may be a computer-readable storage medium. The computer-readable storage medium is a non-transitory medium. Examples of the non-transitory medium are, besides the above-described memory 12, recording mediums such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The memory 12 stores, as shown in FIG. 1, the OS 21 implemented with a general-use printing program 41, a supporting program 42 and an editing APP 43. The supporting program 42 is an example of a supporting program. The supporting program 42 is, for example, a hardware support APP (abbreviated as HSA) of which specification is published by Microsoft Corporation. The OS 21 is, for example, Microsoft Windows®, MacOS® or Linux®. It is noted that, in the memory 12, in addition to the data/APP shown in FIG. 1, various pieces of data including information regarding connected device, various programs of browser and the like are stored.

The general-use printing program 41 is an APP to cause various printers such as the printer 2 to execute printing from the PC 1 and is an OS-standard printing program which is implemented in the OS 21 in advance. The general-use printing program 41 according to the present embodiment is configured to generate print data the printer can use for printing based on image data subjected to be printed. The general-use printing program 41 is an example of a printing program.

The general-use printing program 41 is a general-purpose APP which can be used for any of a plurality of models of printers supplied by various printer venders. The general-use printing program 41 is configured to cause any of the plurality of models of printers to perform operations which are commonly implemented in the plurality of models of printers. Alternatively, the general-use printing program 41 may be a program supplied from the printer venders to a vender of the OS 21 (e.g., the program may be a kind of printer driver, which is supplied by a printer vender, to be implemented in the OS 21 in advance) so that the general-use printing program 41 is implemented in the OS 21 in advance.

The supporting program 42 is a program which executes processes based on the instruction by the OS 21 in association with the startup of the general-use printing program 41 and an APP which supports controlling of hardware subjected to the instruction. The supporting program 42 is started, for example, by the general-use printing program 41. The supporting program 42 is a program that is prepared by printer venders, such as a vender of the printer 2, for each type of printers. For example, a supporting program 42 for inkjet printers and a supporting program 42 for laser printers are prepared. The supporting program 42 may be prepared not only for each type of printers but also for each model or for each model series of printers.

The vender of the printer registers the supporting program 42 with a platform supplied by the vender of the OS 21 in accordance with a procedure designated by the vender of the OS 21. When a printer 2 is newly connected to the PC 1 and the supporting program 42 corresponding to the printer 2 is registered with the platform, the OS 21 downloads the supporting program 42 from a sever in which the supporting program 42 is stored and implements the same in the PC 1.

Then, the OS 21 associates identification information of the implemented supporting program 42 with the printer information of the newly connected printer 2 and stores the same in the memory 12. In the PC 1 to which a plurality of models of printers are connected, a plurality of supporting programs respectively corresponding to a plurality of types of the plurality of models are implemented in the OS 21, and information associating the plurality of printers with the plurality of supporting programs is stored in the memory 12. That is, in the memory 12, as the printer information for each of the printers connected to the PC 1, information on the supporting program 42 corresponding to each printer is stored in addition to the model information and the access information of each printer.

The editing APP is, for example, an APP for generating and/or editing image data and document data. Examples of the editing APP 43 are Microsoft Word® and Power Point®. Further, the editing APP 43 may be an APP provided by the vender of the printer 2 and/or printer 3. The editing APP 43 is configured to receive a user operation including an instruction to cause the printer 2 to perform a particular operation. Specifically, the editing APP 43 is configured to receive, through the UI 20, a print instruction which causes the printer 2 to execute printing. The editing APP 43 is an example of application program.

It is noted that processes and process steps of each flowchart described below basically indicate processes of the CPU 11 in accordance with instructions described in respective programs such as the supporting program 42. That is, in the following description of the processes and steps, terms "determine," "extract," "select," "calculate," "identify," "obtain," "receive," "control" and the like are those performed by the CPU 11. It is noted that the processes by the CPU 11 include controlling of hardware using an API of the OS 21. In the following description, operations of the programs will be described with omitting the detailed description of the OS 21. That is, in the following description, a description "a program B controls hardware C" may be interpreted to "a program B uses the API of the OS 21 to control the hardware C." Further, a process of the CPU 11 in accordance with the instruction described in a program may be described in a simplified manner. For example, the name of the program is omitted and simply described such that "the CPU 11 performs." Further, a process of the CPU 11 in accordance with an instruction described in the program may be described in a simplified manner such that "the program A performs" with omitting the term "CPU."

It is noted that the term "obtain" is used to mean that a request is not necessarily be made. That is, a process of the CPU 11 to receive data without any request is included within a concept that "the CPU 11 obtains data." Further, the term "data" in the present specification is used to mean a bit array readable by a computer. Multiple pieces of data having different formats but substantially the same contents will be treated as the same data. So is the information in the present specification. It is noted that terms "request" and "instruct" represent concepts of outputting information indicating something is requested and information indicating something is instructed, respectively. It is also noted that information representing something is requested or something is instructed may be simply referred to by terms "request" or "instruct."

Further, a process of the CPU 11 to determine whether or not information A indicates an event B may be described conceptually such that "the CPU 11 determines whether event B or not based on information A." Furthermore, a process of the CPU 11 to determine whether information indicates event B or event C may be described conceptually such that "the CPU 11 determines whether event B or event C based on information A."

Next, a configuration of the supporting program 42 and a printing procedure including processes based on the supporting programs 42 of the present embodiment will be generally described with reference to a sequential chart shown in FIG. 2. The supporting program 42 is a program that the general-use printing program 41 instructs to execute when a print instruction to execute printing using the general-use printing program 41 is received through the editing APP 43 or the like in a state where a printer corresponding to the supporting program 42 is designated. In the following description, a case where the PC 1 receives, through the UI 20 (e.g., with the editing APP 43), an instruction to execute printing with the printer 2 through the general-use printing program 41 in a state where image data subjected to be printed is designated and the supporting program 42 corresponding to a type of a model of the printer 2 is implemented in the PC 1 will be described.

Firstly, the editing APP 43 receives, through the UI 20, designation of an image subjected to be printed and an input of an instruction to execute printing (arrow A). An image that the editing APP 43 displays is an example of an image subjected to be printed. The editing APP 43 displays, for example, documents edited with the editing APP 43 or pictures and the like read with the editing APP 43 as the image. Then, the editing APP 43 which received the print instruction delivers a print execution notification indicating contents of received print instruction to the OS 21. It is noted that, in FIG. 2, operations of the OS 21 are omitted.

When the print execution notification indicating usage of the general-use printing program 41 is received, the OS 21 activates the general-use printing program 41 and delivers the print execution notification to the general-use printing program 41 (arrow B). The general-use printing program 41 can obtain, from the print execution notification, various pieces of information included in the print instruction such as information indicating a printer to be caused to execute printing, print queue information for identifying a print queue, information indicating print parameters set with the APP, information indicating image data subjected to be printed, and information for identifying a user who instructed to execute printing. It is noted that, as will be described later, these pieces of information can be used in the supporting program 42 as well.

The general-use printing program 41 generates intermediate image data by converting a format of the image data included in the print execution notification to a format of the intermediate image data and generates a print job including the intermediate image data (arrow C). There are various types of image data as the image data included in the editing APP 43, and the general-use printing program 41 converts the received image data to the intermediate image data that is suitable for the generation of the print data. It is noted that, if the image data included in the print execution notification is suitable for the generation of the print data, the intermediate image data generation process may be omitted and the image data may be directly used as the intermediate image data. The intermediate image data is, for example, XPS format data.

Further, the general-use printing program 41 identifies, based on the information included in the print execution notification, a printer designated as a device to be caused to execute printing. For example, when the printer 2 is designated as the device to be caused to execute printing, the general-use printing program 41 identifies the model of the printer 2 based on the model information of the printer included in the printer information stored in the memory 12. Then, since the supporting program 42 corresponding to the printer 2 designated by the print instruction is stored in the memory 12, the general-use printing program 41 activates the supporting program 42 by outputting an execution command for causing the supporting program 42 to execute processes. The general-use printing program 41 activates the supporting program 42 prior to starting generation of the print data by the general-use printing program 41 or after the generation of the print data by the general-use printing program 41.

The general-use printing program 41 generates the print data based on the intermediate image data (arrow D). The print data generated by the general-use printing program 41 is print data of a format that can be used in printing with various types of printers. The print data is, for example, PWG Raster format data or PDF format data.

After the generation of the print data, the general-use printing program 41 outputs an execution command for causing the supporting program 42 to execute a print data editing process for editing the generated print data (arrow E). The print data is attached to the execution command of the print data editing process.

Upon receiving the execution command from the general-use printing program 41, the supporting program 42 starts the print data editing process (arrow F). The supporting program 42 can obtain various types of information included in the print instruction apart from the print parameters from the general-use printing program 41 through the execution command of the print data editing process. The print data editing process is an example of a print data after-generating process, and the print data after the edition is an example of after-processing information.

In the print data editing process, for example, the supporting program 42 adds a command for causing the printer 2 to execute a function unique to the printer 2 to the print data. The function unique to the printer 2 includes, for example, a toner saving function and a finisher function. If the printer 2 has functions of adding watermarks, header/footer and the like to an image by itself, the supporting program 42 may add commands for causing the printer 2 to execute these functions to the print data. After executing the process for editing the print data, the supporting program 42 returns an end notification indicating the end of the process to the general-use printing program 41 and terminates the process. The end notification includes an editing result (i.e., the edited print data) of the print data editing process.

In response to receiving the end notification from the supporting program 42, the general-use printing program 41 transmits a print command to the printer 2 (arrow H). The printer 2 which received the print command executes printing of an image of print data in accordance with the print data attached to the print command. If print data to which commands are attached is received, the printer 2 executes operations indicated by the commands when executing printing. It is noted that, after the process for editing the print data is finished, the supporting program 42 may transmit the print command to the printer 2 through the communication I/F 30 without using the general-use printing program 41.

In the print system of the present embodiment, in response to a request from the general-use printing program 41 or the editing APP 43, the supporting program 42 provides a program which has requested the status information with one or more pieces of status information of one or more print jobs to. For example, in response to a request from an APP such as the editing APP 43 which has received a print instruction for causing the printer 2 to execute printing, the general-use printing program 41 requests the status information of the print job to the supporting program 42. Or, the editing APP 43 may request the status information to the supporting program 42.

A user who has input a print instruction through the APP such as the editing APP 43 may want to know, thorough the APP, a progress status of printing by the print instruction. The editing APP 43 of the present embodiment receives a notifying instruction instructing the editing APP 43 to notify, through the UI 20, a progress status of a print job of a received print instruction. For example, the editing APP 43 receives a print instruction for causing the printer 2 to execute printing using the general-use printing program 41 and to which the notifying instruction is added. A general procedure of processes by each program in case the print instruction to which the notifying instruction of the progress status has been added through the editing APP 43 is received in the print system of the present embodiment will be described with reference to a sequential chart shown in FIG. 3.

Figure 2:
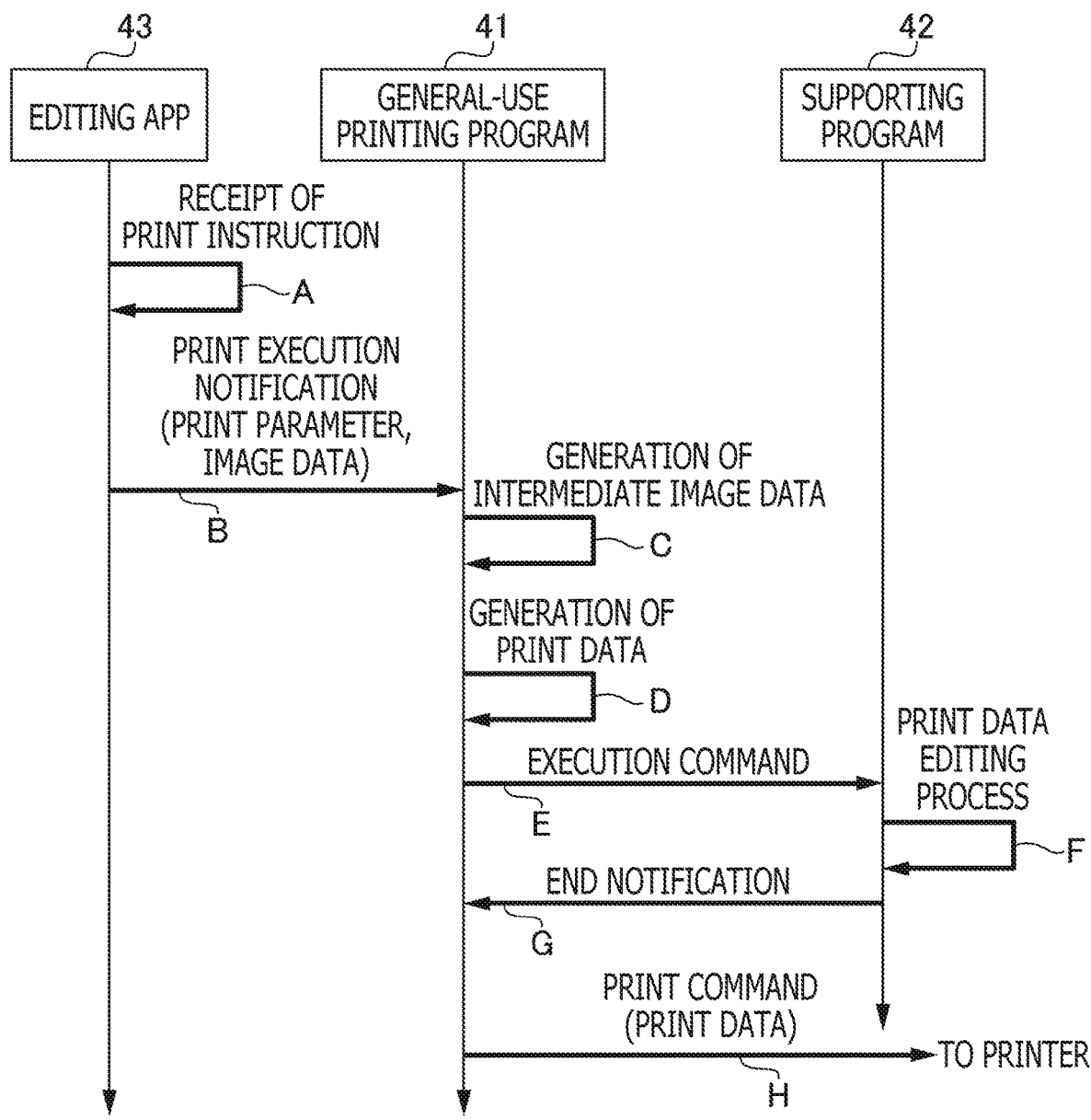
FIG. 2 is a sequential chart showing an example of an order of operations by each program.
Figure 3:
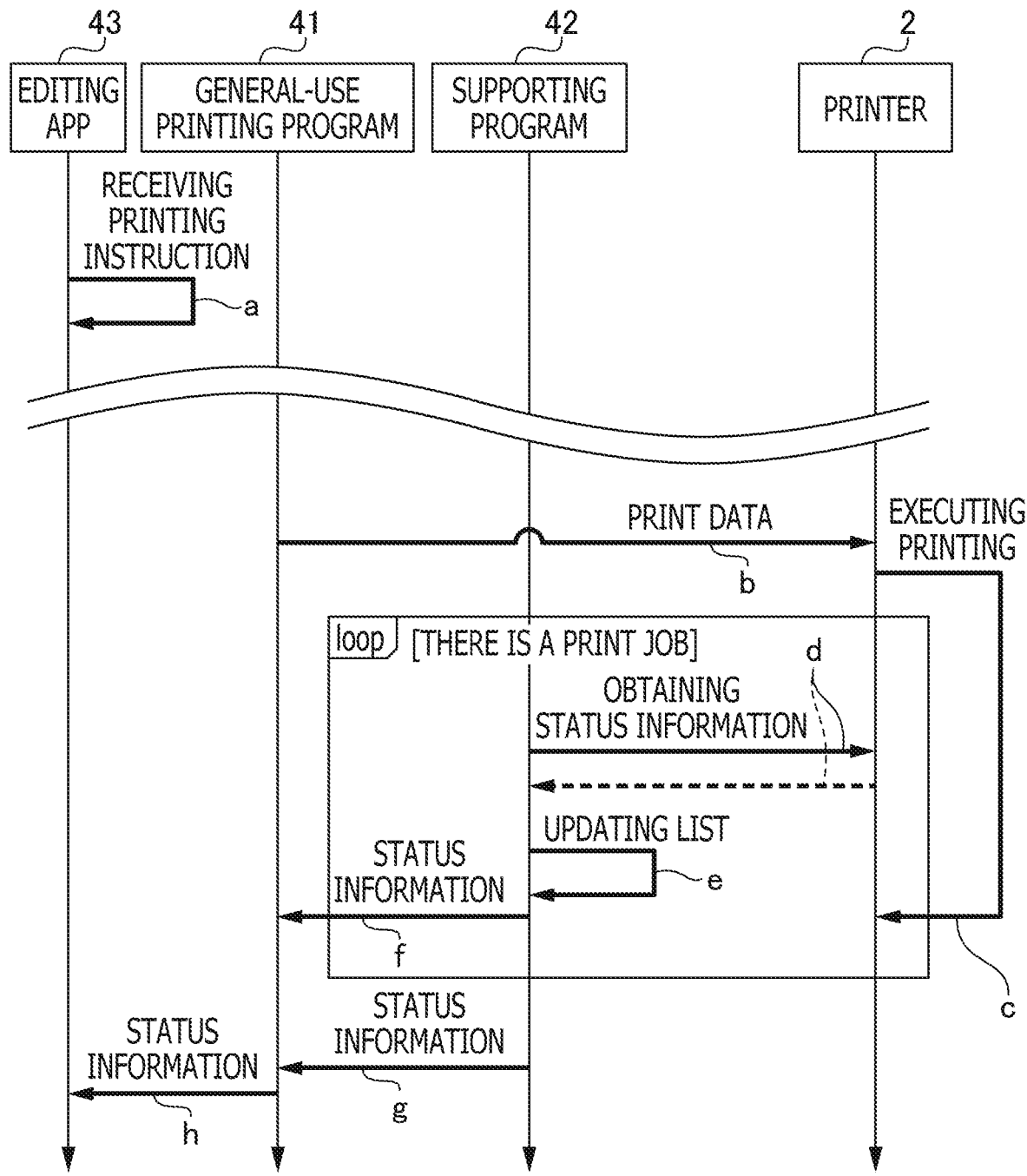
FIG. 3 is a sequential chart showing a procedure for providing status information.

As described above, upon receiving the print instruction through the editing APP 43 (arrow A shown in FIG. 2 and arrow a shown in FIG. 3), the general-use printing program 41 generates the print data and transmits the print data to the printer 2 (arrow H shown in FIG. 2 and arrow b shown in FIG. 3). The printer 2 receives the print data and starts executing printing (arrow c shown in FIG. 3). It is noted that identification information corresponding to the print instruction through the editing APP 43 is given to a print job, and the editing APP 43 and the general-use printing program 41 shares the identification information of the print job.

As described above, the supporting program 42 executes the print data editing process (arrow F shown in FIG. 2) before the print data is transmitted from the general-use printing program 41 to the printer 2. The supporting program 42 obtains the identification information of the print job from information added to the print data in the print data editing process. Then, the supporting program 42 edits the print data as necessary. The supporting program 42 transmits the end notification to the general-use printing program 41 after the print data editing process is finished and starts monitoring the status of the print job. Then, the supporting program 42 stores information of each monitored print job in the memory 12.

The supporting program 42 stores, in the memory 12, the identification information of a print job and the status information of the print job in association with each other as a status information list 51 as shown in FIG. 4. The status information list 51 shown in FIG. 4 is an example of a list to which the status information is to be registered for each of print jobs which are instructed to be printed with "Printer A" and "Printer B", being the printers to which the supporting program 42 is adapted. The supporting program 42 stores the latest status information list 51 in a storage area for the supporting program 42 in the memory 12. The storage area for the supporting program 42 may be, for example, a registry prepared by the OS 21.

The supporting program 42 obtains information indicating a status of a print job from a printer for example by transmitting, to the printer, an inquiry to which identification information of the print job are attached. The status of a print job includes "executing printing", "standby for printing", "aborting printing", "no corresponding job" and the like. For example, if a print job has been deleted from a printer due to completion of printing or due to reception of a print job deletion command, the status of the print job will be "no corresponding job". If it is impossible to communicate with the printer 2 due to communication error or power-off, the status of the print job will be "unknown".

When there is one or more print jobs remaining in the printer 2, the supporting program 42 monitors the statuses of the one or more print jobs. For example, the supporting program 42 executes a status monitoring process for periodically making the inquiry of the printer 2 to obtain the status information (arrow d shown in FIG. 3) and updates the status information list 51 using the obtained information (arrow e). Details of the status monitoring process will be described later.

In response to the inquiry from the supporting program 41, the printer 2 returns, to the supporting program 42, status information including, for example, information indicating a status of itself, information indicating accumulated print jobs, and information indicating a print job which is under printing. After the printing based on the print job is completed, the printer 2 may transmit information indicating completion of printing to the supporting program 42 before deleting the print data included in the print job.

For example, as shown in FIG. 4, the supporting program 42 assigns "under printing" to the status information of a print job which is under printing and assigns "unexecuted" to the status information of a print job of which the print data has already been received and which is before starting printing. If an error or the like has occurred in the printer and printing based on a print job has been aborted, the supporting program 42 assigns "aborting printing" to the status information of the print job.

If information indicating that printing has been completed is obtained from the printer, the supporting program 42 assigns "printing completed" to the status information of the print job. It is noted that, if a print job of which printing with a printer has been started does not exist in the printer, the supporting program 42 may determine that printing based on the print job has been completed.

A timing at which the supporting program 42 starts the status monitoring may be before or after the general-use printing program 41 starts transmission of the print data, or may be after a particular amount of time has elapsed from the returning of the end notification to the general-use printing program 41. Time intervals for repeating the inquiry may be particular fixed time intervals or may be time intervals that can be changed by settings set by the user.

The supporting program 42 provides the general-use printing program 41 with one or more pieces of status information of one or more print jobs based on the information obtained from the printer 2 (arrow f shown in FIG. 3). If there is no more monitored print job in the printer 2, the supporting program 42 terminates the status monitoring. Then, for example, the supporting program 42 provides the general-use printing program 41 with the status information indicating "no job" (arrow g). A print job is deleted from the printer 2 when it is completed normally or deleted by the user.

The general-use printing program 41 delivers the status information provided by the supporting program 42 to the editing APP 43 based on the request from the editing APP 43 (arrow h). Accordingly, the editing APP 43 can display a screen indicating one or more pieces of status information of one or more print jobs. Therefore, the user can recognize a progress status of each print job through the editing APP 43.

If the editing APP 43 requests to provide with the status periodically until the end of printing, the general-use printing program 41 timely delivers the status information provided at the arrow f and the arrow g to the editing APP 43. If the editing APP 43 requests to provide the status at the end of the printing, the general-use printing program 41 does not deliver the status information at the arrow f and only delivers the status information provided at the arrow g to the editing APP 43. The editing APP 43 may receive the notifying instruction of current progress status related to the received print instruction and, in this case, the editing APP 43 requests current status information to the general-use printing program 41. The general-use printing program 41 delivers the current status information based on the request from the editing APP 43.

Figure 5:
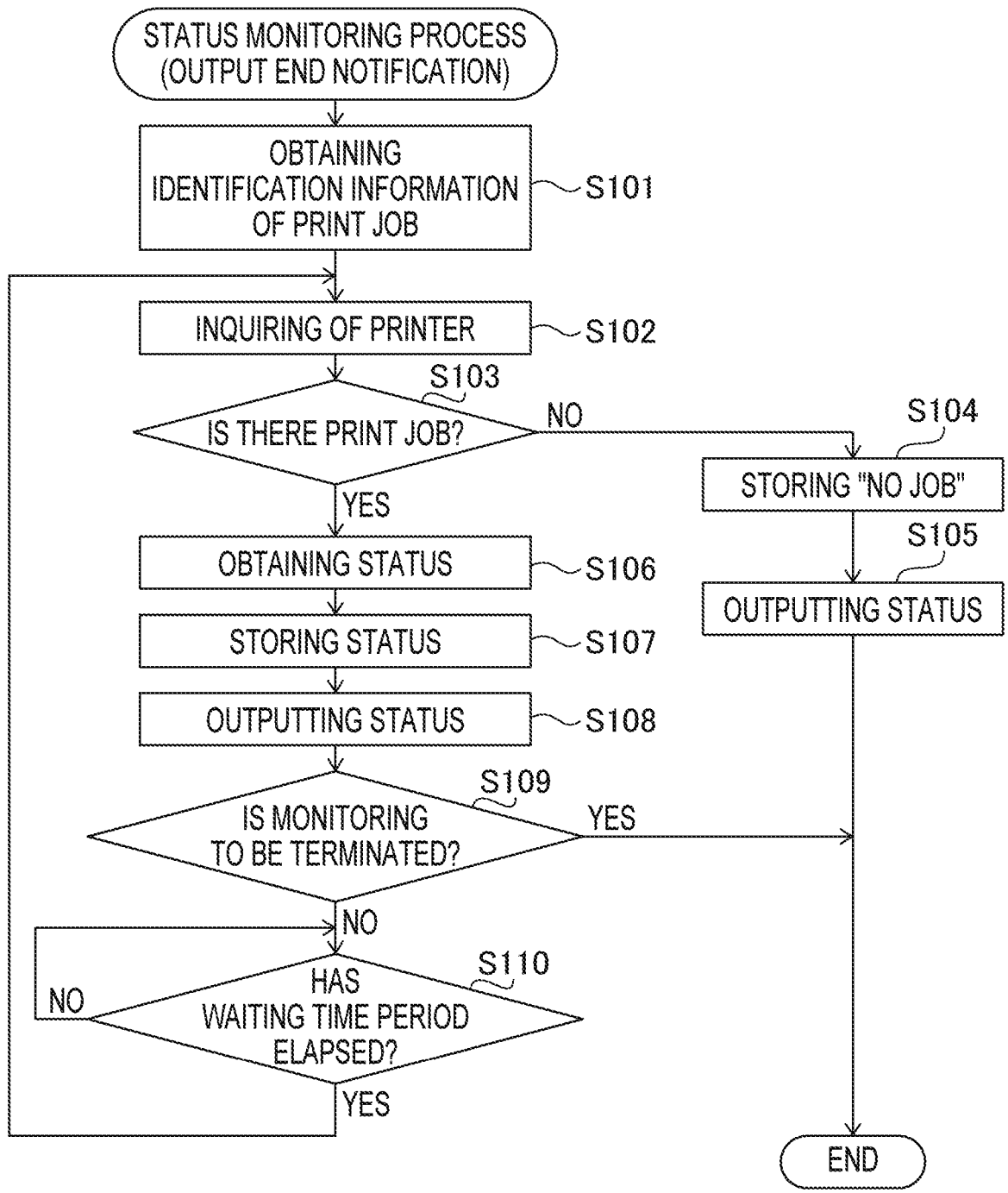
FIG. 5 is a flowchart showing a procedure of a status monitoring process.

Next, a procedure of the status monitoring process by the supporting program 42 executed in the arrow d shown in FIG. 3 will be described with reference to a flowchart shown in FIG. 5. This status monitoring process is executed in the CPU 11 of the PC 1 in accordance with the supporting program 42 for example in response to the supporting program 42 outputting the end notification of the print data editing process to the general-use printing program 41.

In the status monitoring process, the CPU 11 obtains the identification information of a print job of which the end notification is output to the general-use printing program 41 (S101). The identification information of the print job includes information of a printer to be caused to execute printing. In S101, a printer which executes the print job to be monitored is identified as well. S101 is an example of an identifying process. Then, the CPU 11 inquires of the identified printer about the status of the print job (S102).

The CPU 11 determines whether there is the print job in the printer or not based on a reply from the printer (S103). For example, if the print job has been deleted because of completion of the printing, there is no need to continue monitoring the print job. Therefore, if it is determined that the print job does not exist (S103: NO), the CPU 11 stores information (i.e., "no corresponding job") indicating that the print job does not exist to the status information list 51 (S104) and terminates the monitoring of the print job. The condition that is to be determined to be "NO" at S103 is an example of an execution termination condition.

Further, the CPU 11 outputs the status information of the print job of which monitoring has been terminated to the general-use printing program 41 (S105). S105 is an example of a status providing process.

If it is determined that the print job exists (S103: YES), the CPU 11 obtains the status information of the print job from the printer (S106). S106 is an example of a status obtaining process. Then, the CPU 11 stores the obtained status information in the status information list 51 (S107). The CPU 11 further outputs the obtained status information to the general-use printing program 41 (S108). S108 is an example of the status providing process. It is noted that, in place of obtaining the status information for each print job, the CPU 11 may collectively obtain pieces of the status information of all print jobs as a status of the printer.

Further, the CPU 11 determines whether to terminate the monitoring of the print job or not (S109). For example, the CPU 11 determines to terminate monitoring of the progress status of a print job if printing based on the print job has been terminated or when a particular time period has elapsed from the start of transmission of print data. S109 is an example of the execution termination condition. Also, the CPU 11 may terminate the monitoring if there is no reply for a particular standby time period after making the inquiry of the printer.

If it is determined not to terminate the monitoring of the print job (S109: NO), the CPU 11 determines whether a particular waiting time period has elapsed after inquiring the status of the print job (S110). If it is determined that the particular waiting time period has not elapsed (S110: NO), the CPU 11 waits for the elapse of the particular waiting time period. If it is determined that the particular waiting time period has elapsed (S110: YES), the CPU 11 returns to S110 and makes the inquiry of the printer again.

After S105, or if it is determined to terminate the monitoring of the print job (S109: YES), the CPU 11 terminates the status monitoring process.

It is noted that the status information list 51 is deleted for example when the PC 1 is shut down. The supporting program 42 may for example delete, from the status information list 51, the status information of a print job of which a predetermined keeping time period has elapsed after the monitoring of the status was terminated.

In place of timely providing with the status information, the supporting program 42 may provide with the status information when the request from the editing APP 43 is received. For example, upon receiving the status information request from the user, the editing APP 43 attaches the identification information of the received print job to the status information request and transmits the status information request to the general-use printing program 41. The general-use printing program 41 attaches the identification information of the print job to the status information request and transmits the status information request to the supporting program 42.

Figure 6:
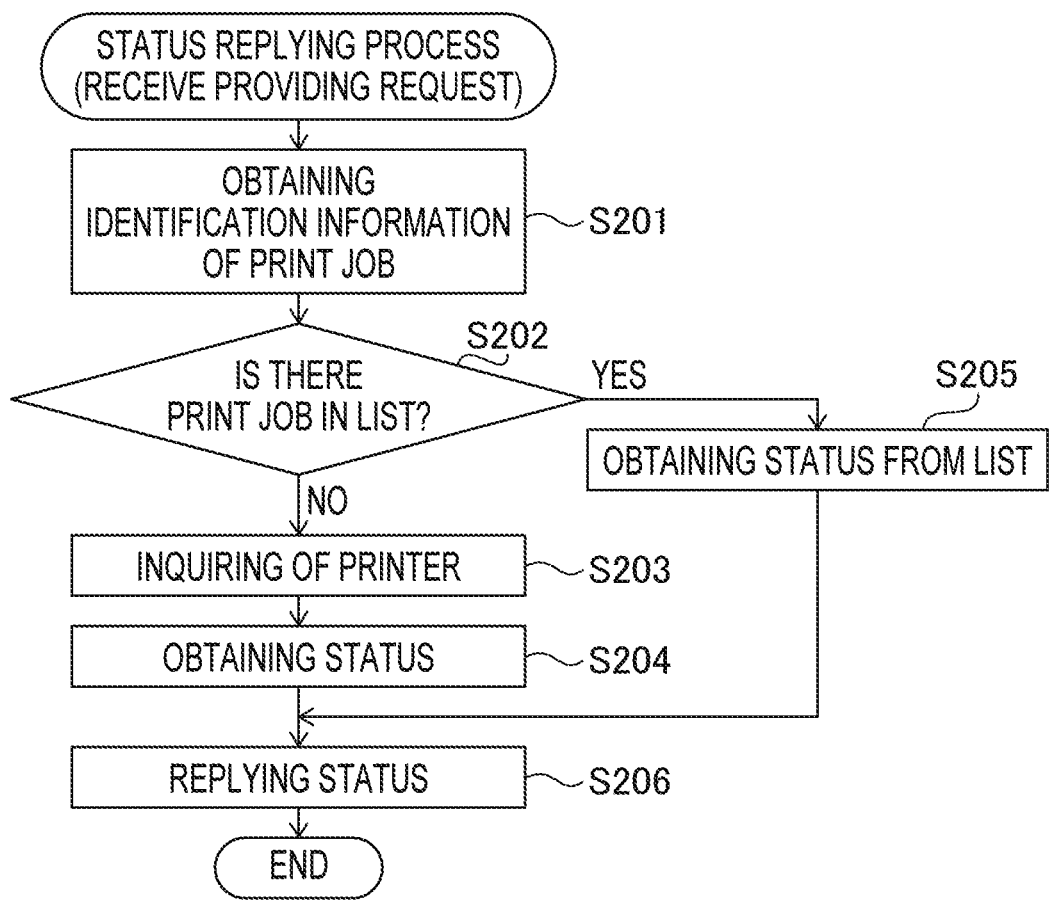
FIG. 6 is a flowchart showing a procedure of a status reply process.

A procedure of a status replying process, which is a process for providing with the status information in response to the request from the general-use printing program 41, will be described with reference to a flowchart shown in FIG. 6. This status replying process is executed by the CPU 11 of the PC 1 in accordance with the supporting program 42 in response to receiving the status providing request from the general-use printing program 41.

In this status replying process, the CPU 11 obtains the identification information of a print job designated by the received providing request (S201). The CPU 11 determines whether the status information of the print job corresponding to the obtained identification information is stored in the status information list 51 or not (S202).

If it is determined that the status information of the print job corresponding to the obtained identification information is not stored in the status information list 51 (S202: NO), the CPU 11 inquires of a printer designated by the print job about the status of the print job (S203). The CPU 11 obtains the status information of the print job by receiving a reply from the printer (S204). S204 is an example of the status obtaining process.

On the other hand, if it is determined that the status information of the print job corresponding to the obtained identification information is stored in the status information list 51 (S202: YES), the CPU 11 reads out the status information of the print job from the status information list 51 (S205). After S204 or S205, the CPU 11 delivers a reply including the obtained status information to the general-use printing program 41 (S206) and terminates the status replying process. S206 is an example of the status providing process. Since the supporting program 42 can make the reply without communicating with the printer if the status information of the designated print job is stored in the status information list 51, it is expected that the reply can be made in a short time period.

Figure 7:
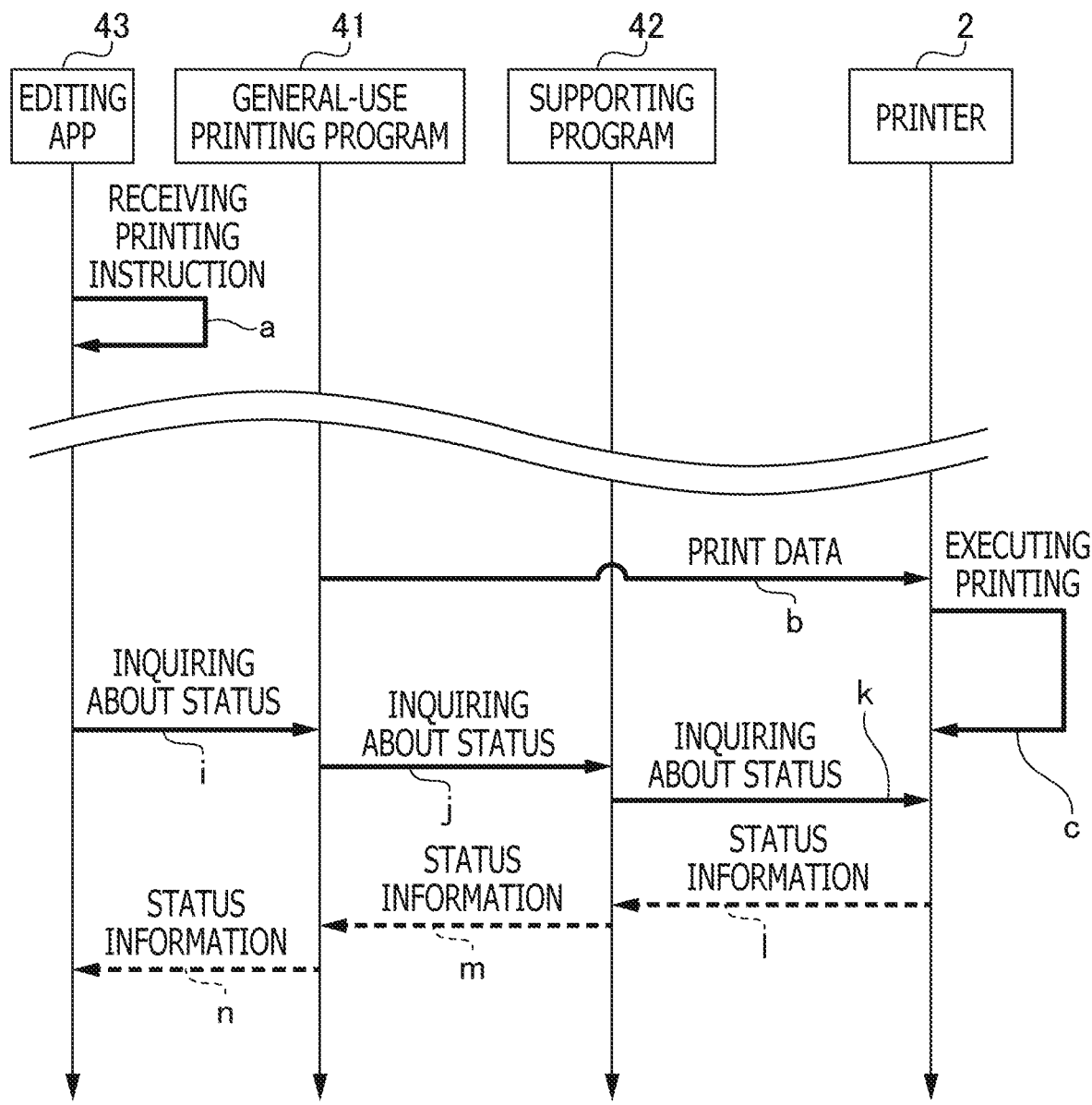
FIG. 7 is a sequential chart showing a procedure for providing status information.

It is noted that, in place of monitoring and storing pieces of the status information of all print jobs, when the providing request of status information is received, the supporting program 42 may inquire of the printer 2 about the status of the print job of which the status information is requested. In this case, the status reply processes S202 and S205 are not executed and, after S201, the process proceeds to S203. A general procedure of processes by each program in this case will be described with reference to a sequential chart shown in FIG. 7. In FIG. 7, processes identical to those in FIG. 3 are assigned the same numerals as in FIG. 3.

When the editing APP 43 receives the print instruction (arrow a), the general-use printing program 41 transmits the print data to the printer 2 (arrow b), and the printer 2 executes printing (arrow c). Then, upon receiving the inquiry about the status from the user, the editing APP 43 outputs the inquiry about the status information to the general-use printing program 41 while adding the identification information of the print job (arrow i). The inquiry about the status information is an example of an obtaining request.

In response to the inquiry from the editing APP 43, the general-use printing program 41 inquires the status to the supporting program 42 (arrow j). The supporting program 42 receives the inquiry from the general-use printing program 41, inquires of the printer 2 about the status (arrow k), and obtains the status information from the printer 2 (arrow l). It is noted that, in this case, the supporting program 42 may inquire the status of the designated print job to the printer 2, and the printer 2 may reply only the status information of the print job corresponding to the identification information included in the inquiry.

The supporting program 42 further delivers the status information obtained from the printer 2 to the general-use printing program 41 (arrow m), and the general-use printing program 41 delivers the received status information to the editing APP 43 (arrow n). Therefore, the editing APP 43 can display the status information the user desires using the UI 20.

By making the inquiry to the printer in response to the request as described above, communication load between the supporting program 42 and the printer can be suppressed as compared to the case where the status is continuously monitored.

It is noted that the timing at which the general-use printing program 41 inquires of the supporting program 42 about the status is not limited to when the inquiry from applications such as the editing APP 43 is received. For example, if the OS 21 has a function of inquiring of the general-use printing program 41 about the job status, the general-use printing program 41 may make the inquiry of the supporting program 42 upon receiving the inquiry from the OS 21. The general-use printing program 41 may also inquire about the status to the supporting program 42 at its own timing.

Figure 8:
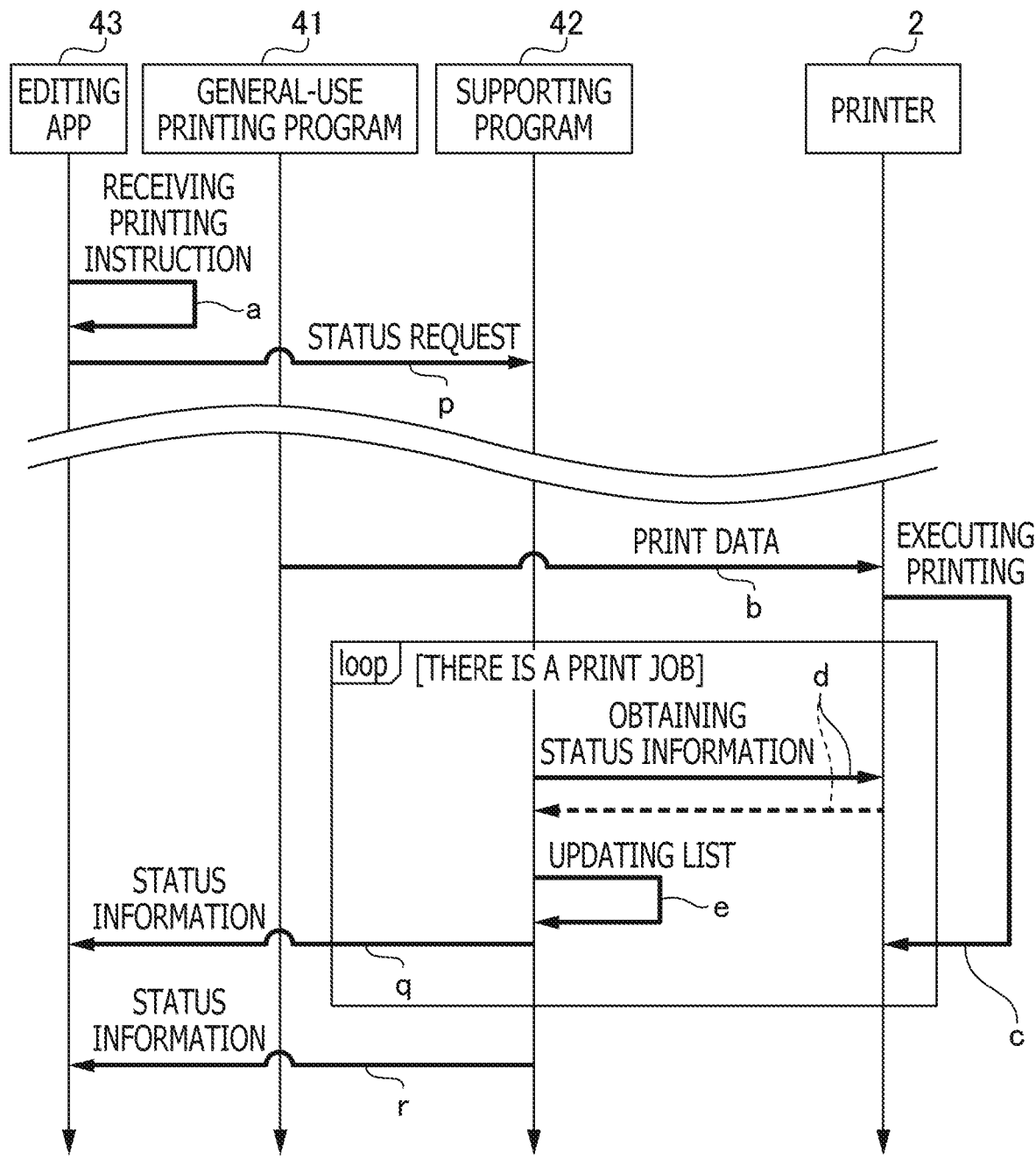
FIG. 8 is a sequential chart showing a procedure for providing status information.

The supporting program 42 may directly receive the status information providing instruction from applications such as the editing APP 43 and may directly provide applications such as the editing APP 43 with the status information. In this case, a procedure of processes by each program is for example as shown in FIG. 8. Upon receiving the instruction to execute printing (arrow a), the editing APP 43 outputs the execution notification to the general-use printing program 41 and delivers the status information providing request to the corresponding supporting program 42 (arrow p).

The supporting program 42 executes the status monitoring process based on the request from the editing APP 43 as described above. For example, while one or more print jobs are remaining in the printer 2, the supporting program 42 monitors the status of one or more print jobs. For example, the supporting program 42 executes the status monitoring process for periodically making inquiry of the printer 2 to obtain the status information (arrow d) and updates the status information list 51 using the obtained information (arrow e).

If the editing APP 43 requests to provide with the status periodically until the end of printing, the supporting program 42 timely outputs the information obtained at the arrow d to the editing APP 43 (arrow q). On the other hand, if the editing APP 43 requests to provide with the status at the end of printing, the supporting program does not deliver the status information at the arrow q and outputs the status information to the editing APP 43 after completion of the print job (arrow r). The editing APP 43 may receive the notifying instruction of current progress status related to the received print instruction and, in this case, the editing APP 43 requests current status information to the supporting program 42. The supporting program 42 outputs the current status information based on the request from the editing APP 43.

As described above in detail, when there is a print instruction of printing using the general-use printing program 41, the supporting program 42 of the present embodiment identifies a printer corresponding to a print job, obtains the status information from the identified printer, and outputs the status information. For example, by the general-use printing program 41 providing the editing APP 43 with the status information, the editing APP 43 can display the status of the print job. Therefore, the user can recognize the progress status of the process in detail through an application program to which the print instruction is input.

Furthermore, in the present embodiment, since the supporting program 42 repeatedly inquires of the printer about the status after starting transmission of the print job, the supporting program 42 can quickly reply the status of the print job when there is the inquiry from the editing APP 43. Further, since a condition to terminate the status inquiry is set, it is possible to avoid a process being continued to execute wastefully. When the execution of the print job is terminated or when there is no print job, since there is no need to monitor the status, it is preferable to terminate the status inquiry. If a particular time period has elapsed from the start of the transmission of the print data, since the necessity to monitor the status of the print job is low, it is preferable to terminate the status inquiry.

In the present embodiment, since the status information of each print job is stored in the status information list 51, the supporting program 42 can make the reply in a short time in response to the request from the general-use printing program 41. On the other hand, if the supporting program 42 inquiries of the printer 2 each time the general-use printing program 41 requires the status, increase in processing load in the PC 1 can be suppressed.

In the present embodiment, when an application such as the editing APP 43 instructs to execute printing, since the general-use printing program 41 gives the identification information to the print job and returns the print job to the application, the identification information of the print job can be shared with the application and the general-use printing program 41. Furthermore, since the identification information of the print job can be shared with the supporting program 42 by including the identification information of the print job in the instruction to the supporting program 42, necessary information can be accurately provided to the supporting program 42.

It is noted that the embodiment disclosed in the present specification is only an illustrative example and is not intended to limit aspects of the present disclosures. Accordingly, the technique disclosed in the present specification can be modified or enhanced without departing from aspects of the disclosures. For example, the device connected to the PC 1 need not be limited to the printer but may be any device which has a printing function (e.g., an MFP, a copier, a facsimile machine and the like). Further, the number of printers connected to the PC 1 need not be limited to that in the illustrated example but may be one or three or more.

A module that executes each of the processes of the present embodiment is not limited to the supporting program 42 but may be a program that receives instructions form the OS 21 when executing printing using the general-use printing program 41 of the OS 21. For example, the module may be a print workflow app (i.e., Print workflow) of which specification is disclosed by Microsoft.

In the embodiment, as operations of the supporting program 42, only the status information providing process is described. However, the supporting program 42 may further have other roles.

In the embodiment, the supporting program 42 is executed in response to the execution command of the supporting program 42 outputting from the general-use printing program 41. However, the execution timing of the supporting program 42 is not limited to the above. For example, the supporting program 42 may be executed in response to a direct execution instruction from the OS 21 or may be a resident program. If the supporting program 42 is a resident program, the supporting program 42 may execute the aforementioned operations upon receiving execution commands.

In any of the flowcharts disclosed in the embodiment, the order of multiple processes at arbitrary multiple steps may be changed arbitrarily or may be executed in parallel unless there occurs conflicts in processing contents.

The processes disclosed in the present embodiment may be executed by a single CPU, a plurality of CPU's, hardware such as an ASIC or a combination thereof. Further, the processes disclosed in the present embodiment may be realized by various modes such as a non-transitory recording medium storing programs for executing the processes, methods for executing the processes and the like.

What is claimed is:

1. A non-transitory computer-readable recording medium for an information processing apparatus, the information processing apparatus having a controller, the recording medium containing computer-executable instructions realizing a supporting program corresponding to a printer connected to the information processing apparatus, wherein the supporting program, as executed by the controller, causing the information processing apparatus to perform an identifying process, a status obtaining process and a status providing process, the identifying process, the status obtaining process and the status providing process being performed after a print instruction is output to a general-use printing program implemented in an operating system of the information processing apparatus and the general-use printing program generates print data based on the print instruction, the print instruction being an instruction to cause a printer connected to the information processing apparatus to perform printing of an image, the print instruction being an instruction output to the general-use printing program from an application program implemented in the information processing apparatus without being output through the supporting program, the general-use printing program generating a print job based on the print instruction without using a printer driver corresponding to the printer and transmitting the generated print job to the printer without being transmitted through the supporting program, wherein the identifying process is a process of identifying the printer to be caused to execute the print job corresponding to the print instruction by obtaining identification information of the print job from the general-use printing program, wherein the status obtaining process is a process of obtaining status information of the print job by inquiring of an identified printer, through a communication interface of the information processing apparatus, the identified printer being a printer identified by the identifying process, and wherein the status providing process is a process of providing the application program with the status information of the print job obtained by the status obtaining process.

2. The non-transitory computer-readable recording medium according to claim 1, wherein the supporting program, as executed by the controller, causes the information processing apparatus to perform, in response to a notification including the print data generated by the general-use printing program is provided for the supporting program from the general-use printing program, a print data after-generating process of editing the print data generated by the general-use printing program and the status obtaining process, wherein, after the supporting program provides the general-use printing program with after-processing information indicating a processing result of the print data after-generating process, the print data corresponding to the after-processing information is transmitted to the printer from the general-use printing program.

3. The non-transitory computer-readable recording medium according to claim 1, wherein the supporting program, as executed by the controller, causes the information processing apparatus to repeatedly perform the status obtaining process when starting transmission of the print data to the printer.

4. The non-transitory computer-readable recording medium according to claim 3,
wherein the supporting program, as executed by the controller, causes the information processing apparatus to repeatedly perform the status obtaining process after starting transmission of the print data to the printer and until an execution termination condition is satisfied.

5. The non-transitory computer-readable recording medium according to claim 4,
wherein the execution termination condition is satisfied when one of status information indicating that the print job is successfully completed and status information indicating that the print job does not exist is obtained in the status obtaining process.

6. The non-transitory computer-readable recording medium according to claim 4,
wherein the execution termination condition is satisfied when a particular time period has elapsed from start of transmission of the print data to the printer.

7. The non-transitory computer-readable recording medium according to claim 1,
wherein the supporting program, as executed by the controller, causes the information processing apparatus to perform the status obtaining process in response to receiving a providing request from the general-use printing program.

8. The non-transitory computer-readable recording medium according to claim 7,
wherein the providing request is input to the supporting program from the general-use printing program in response to the application program outputting, to the general-use printing program, an obtaining request to request the general-use printing program to obtain status of the print job.

9. The non-transitory computer-readable recording medium according to claim 8,
wherein the obtaining request input to the general-use printing program from the application program includes identification information of the print job, and the providing request input to the supporting program from the general-use printing program includes the identification information included in the obtaining request, and
wherein, in the status providing process, the supporting program provides the general-use printing program with status information of a print job corresponding to the identification information included in the providing request, the status information including the identification information included in the providing request, the general-use printing program providing the application program with status information including the identification information included in the obtaining request.

10. The non-transitory computer-readable recording medium according to claim 7,
wherein the providing request input from the general-use printing program includes identification information of the print job, and
wherein, in the status providing process, status information of the print job corresponding to the identification information included in the providing request is provided for the general-use printing program.

11. The non-transitory computer-readable recording medium according to claim 1,
wherein the general-use printing program provides the application program with status information provided from the supporting program in the status providing process.

12. An information processing apparatus having a controller,
wherein an operating system of the information processing apparatus has general-use printing program which is program implemented in advance,
wherein a supporting program corresponding to a printer connected to the information processing apparatus and an application program configured to output a print instruction to cause the printer to perform printing are implemented in the information processing apparatus,
wherein the controller is configured to perform, using the supporting program, an identifying process, a status obtaining process and a status providing process, the identifying process, the status obtaining process and the status providing process being performed after a print instruction is output and the general-use printing program generates print data based on the print instruction, the print instruction being an instruction to cause a printer connected to the information processing apparatus to perform printing of an image, the print instruction being an instruction output to the general-use printing program from the application program, without being output through the supporting program, the general-use printing program generating a print job based on the print instruction without using a printer driver corresponding to the printer and transmitting the generated print job to the printer without being transmitted through the supporting program,
wherein, in the identifying process, the controller identifies the printer to be caused to execute the print job corresponding to the print instruction by obtaining identification information of the print job from the general-use printing program,
wherein, in the status obtaining process, the controller obtains status information of the print job by inquiring of an identified printer, through a communication interface of the information processing apparatus, the identified printer being a printer identified by the identifying process, and
wherein, in the status providing process, the controller provides the application program with the status information of the print job obtained by the status obtaining process.

13. A printing method to cause a printer to execute printing based on print data, a general-use printing program being implemented in an operating system of the information processing apparatus, a supporting program corresponding to a printer connected to the information processing apparatus and an application program being implemented in the information processing apparatus, the application program being configured to output a print instruction to instruct the general-use printing program, the print instruction being an instruction to cause the printer to execute printing, the general-use printing program generating print data based on the print instruction,
wherein the printing method includes:
identifying the printer to be caused to execute the print job corresponding to the print instruction by obtaining identification information of the print job from the general-use printing program;

obtaining status information of the print job by inquiring of an identified printer, through a communication interface of the information processing apparatus, the identified printer being a printer identified by the identifying process; and providing the application program with the status information of the print job obtained by the status obtaining process, wherein the print instruction being an instruction output to the general-use printing program from the application program, without being output through the supporting program, the general-use printing program generating a print job based on the print instruction without using a printer driver corresponding to the printer and transmitting the generated print job to the printer without being transmitted through the supporting program.

* * * * *